United States Patent
Bangalore et al.

(10) Patent No.: US 10,720,147 B2
(45) Date of Patent: *Jul. 21, 2020

(54) SYSTEM AND METHOD FOR CREATING VOICE PROFILES FOR SPECIFIC DEMOGRAPHICS

(71) Applicant: AT&T Intellectual Property I, L.P., Atlanta, GA (US)

(72) Inventors: Srinivas Bangalore, Morristown, NJ (US); Taniya Mishra, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,128

(22) Filed: Aug. 1, 2019

(65) Prior Publication Data

US 2019/0355343 A1    Nov. 21, 2019

Related U.S. Application Data

(63) Continuation of application No. 15/494,870, filed on Apr. 24, 2017, now Pat. No. 10,373,603, which is a continuation of application No. 14/268,484, filed on May 2, 2014, now Pat. No. 9,633,649.

(51) Int. Cl.

| | | |
|---|---|---|
| G10L 15/22 | (2006.01) | |
| G10L 15/02 | (2006.01) | |
| G10L 17/00 | (2013.01) | |
| G10L 17/04 | (2013.01) | |
| G10L 13/033 | (2013.01) | |
| G10L 15/08 | (2006.01) | |
| G10L 15/06 | (2013.01) | |
| G10L 13/02 | (2013.01) | |
| G10L 13/04 | (2013.01) | |
| G10L 13/047 | (2013.01) | |
| G10L 15/18 | (2013.01) | |

(Continued)

(52) U.S. Cl.
CPC ............ *G10L 13/033* (2013.01); *G10L 13/02* (2013.01); *G10L 13/043* (2013.01); *G10L 13/047* (2013.01); *G10L 15/06* (2013.01); *G10L 15/08* (2013.01); *G10L 15/1807* (2013.01); *G10L 17/26* (2013.01); *G10L 25/48* (2013.01)

(58) Field of Classification Search
CPC .......... G10L 13/04; G10L 13/08; G10L 13/00
See application file for complete search history.

(56) References Cited

U.S. PATENT DOCUMENTS

| | | |
|---|---|---|
| 7,003,465 B2 | 2/2006 | Morii et al. |
| 7,315,811 B2 | 1/2008 | Cote et al. |
| 8,005,680 B2 | 8/2011 | Kommer |

(Continued)

*Primary Examiner* — Shreyans A Patel

(57) ABSTRACT

Systems, methods, and computer-readable storage devices for receiving an utterance from a user and analyzing the utterance to identify the demographics of the user. The system then analyzes the utterance to determine the prosody of the utterance, and retrieves from the Internet data associated with the determined demographics. Using the retrieved data, the system retrieves, also from the Internet, recorded speech matching the identified prosody. The recorded speech, which is based on the demographic data of the utterance and has a prosody matching the utterance, is then saved to a database for future use in generating speech specific to the user.

20 Claims, 5 Drawing Sheets

(51) Int. Cl.
    *G10L 25/48*           (2013.01)
    *G10L 17/26*           (2013.01)

(56) References Cited

U.S. PATENT DOCUMENTS

| | | |
|---|---|---|
| 8,380,519 B2 | 2/2013 | Lavoie et al. |
| 8,401,853 B2 | 3/2013 | Johnston et al. |
| 8,468,012 B2 | 6/2013 | Lloyd et al. |
| 8,515,765 B2 | 8/2013 | Baldwin et al. |
| 8,606,580 B2 | 12/2013 | Shozakai et al. |
| 2002/0046030 A1 | 4/2002 | Haritsa et al. |
| 2004/0215453 A1 | 10/2004 | Orbach |
| 2004/0225501 A1* | 11/2004 | Cutaia .................. G10L 13/033<br>704/260 |
| 2006/0122840 A1 | 6/2006 | Anderson et al. |
| 2008/0015860 A1* | 1/2008 | Lane .................... G10L 13/047<br>704/258 |
| 2010/0169088 A1* | 7/2010 | Johnston ................ G06Q 30/02<br>704/231 |
| 2012/0072219 A1* | 3/2012 | Johnston ................ G10L 15/22<br>704/251 |
| 2013/0110511 A1 | 5/2013 | Spiegel et al. |
| 2014/0122080 A1* | 5/2014 | Kaszczuk ............... G10L 13/04<br>704/260 |
| 2014/0200894 A1* | 7/2014 | Osowski ................ G10L 13/08<br>704/260 |
| 2015/0235238 A1* | 8/2015 | Babinowich ....... G06Q 30/0202<br>705/7.31 |

\* cited by examiner

SYSTEM AND METHOD FOR CREATING VOICE PROFILES FOR SPECIFIC DEMOGRAPHICS

PRIORITY INFORMATION

The present application is a continuation of U.S. patent application Ser. No. 15/494,870, filed Apr. 24, 2017, which is a continuation of U.S. patent application Ser. No. 14/268,484, filed May 2, 2014, now U.S. Pat. No. 9,633,649, issued Apr. 25, 2017, the contents of which are incorporated herein by reference in their entirety.

BACKGROUND

1. Technical Field

The present disclosure relates to creating voice profiles for specific demographics and more specifically to acquiring voice parameterizations by extracting acoustic features from human speech data found on the Internet, such as webcasts, videos, and podcasts, then correlating the acoustic features with demographic data of a speaker for delivery to a user.

2. Introduction

Synthetic speech is often produced using a generic set of pre-recorded voices. However, this can result in misunderstandings when the user is not able to understand the synthetic speech due to accent mismatch or due to a preference mismatch. For example, a British user might not understand words or accents used by an American-sounding synthetic voice. While certain systems allow the user to change the voice or accent produced, such preferences can be cumbersome to define and may not have the particular language, accent, or other preferences the user desires in the synthetic voice.

DETAILED DESCRIPTION

A system, method and computer-readable storage devices are disclosed which receive an utterance from a user and analyze the utterance to identify the demographics of the user. For example, based on the received utterance, a system can determine language, accent, probable levels of education and income, race, ethnicity, or current place of residence, such as a specific neighborhood, city, state, or country. The system analyzes the utterance to determine the prosody of the utterance, taking note of how quickly words are spoken, pause between words, rhythm, pitch, energy, accent, etc. The system then retrieves from the Internet (or other database/network storage device) data associated with the determined demographics. Using the retrieved data, the system retrieves, also from the Internet, recorded speech matching the identified prosody. The recorded speech, which is based on the demographic data of the utterance and has a prosody matching the utterance, is then saved to a database for future use in text-to-speech processing.

Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of creating a voice profile for specific demographics, accompanied by variations and various embodiments, will then follow. These variations shall be described herein as the various embodiments are set forth. The disclosure now turns to FIG. 1.

Figure 1:
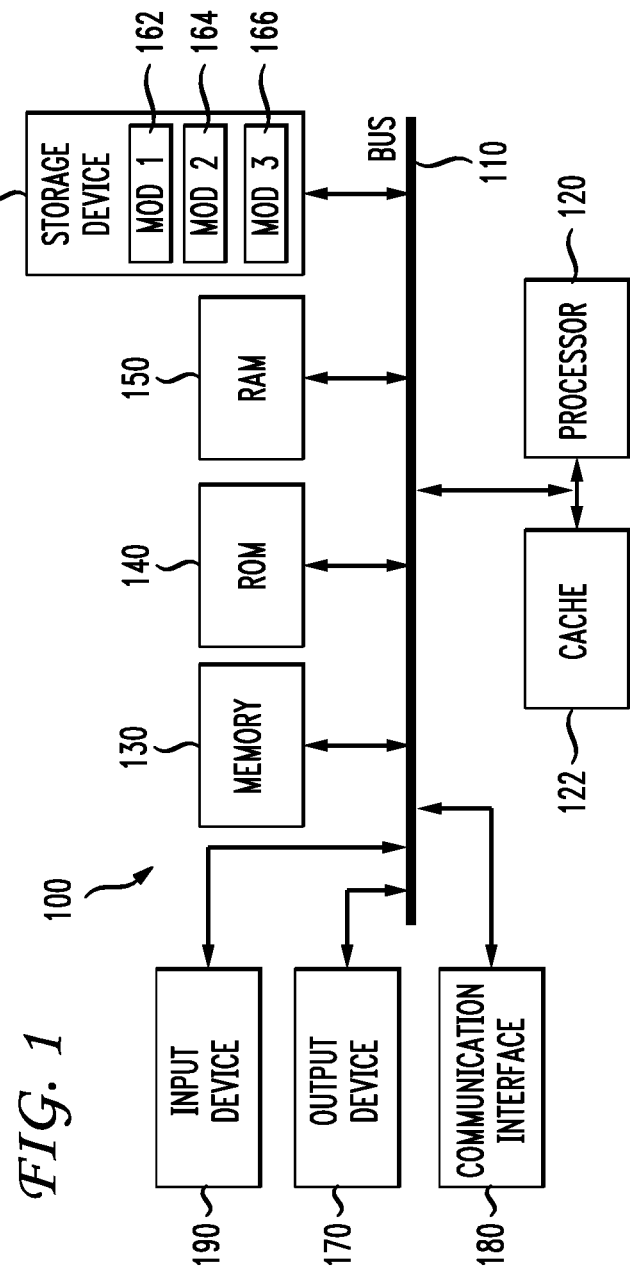
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
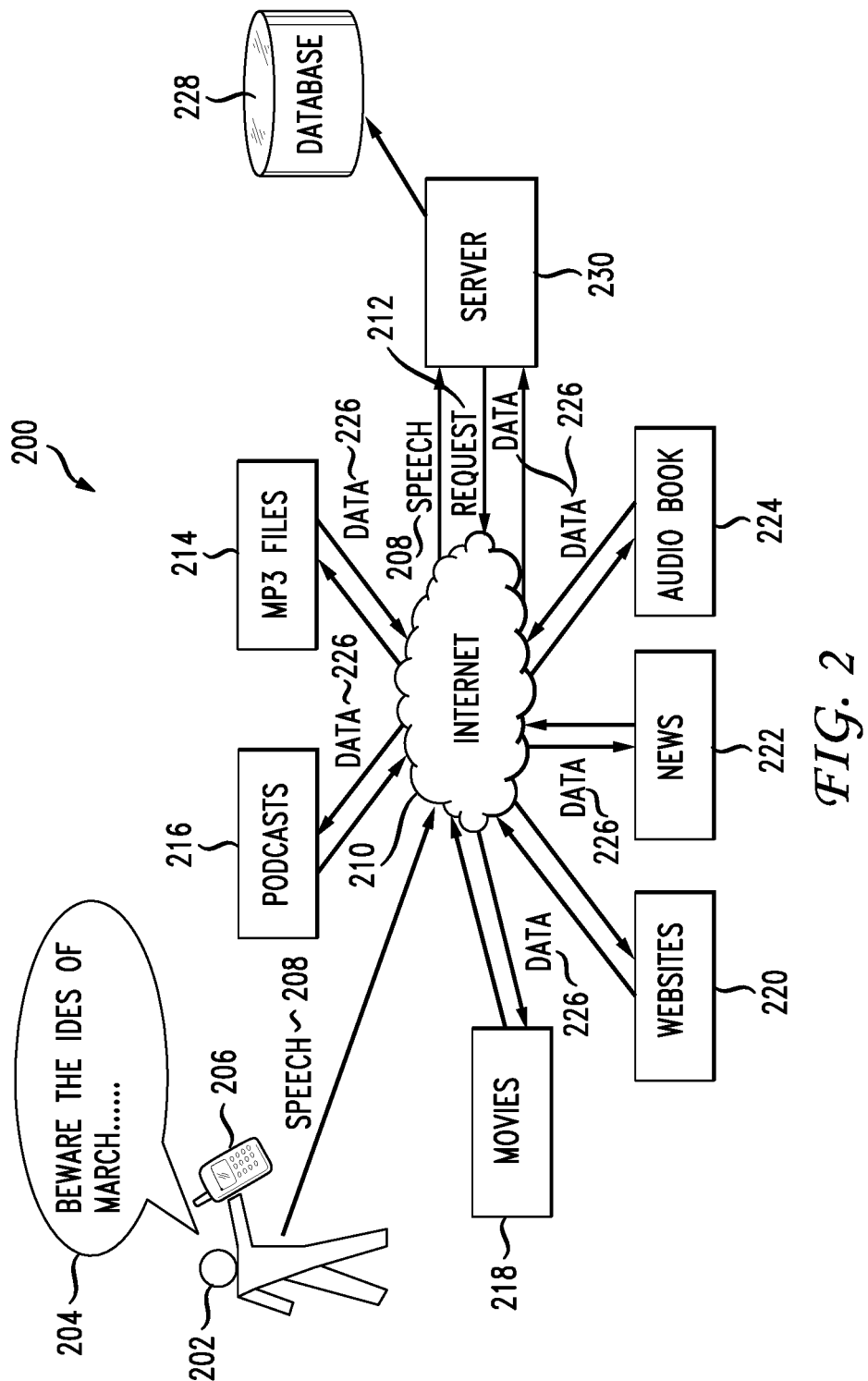
FIG. 2 illustrates an exemplary system architecture.

Having disclosed some components of a computing system, the disclosure now turns to FIG. 2, which illustrates an exemplary system architecture 200. In this example, a user 202 speaks an utterance "Beware the Ides of March" 204. The user's mobile device 206 captures the utterance and transmits the recorded utterance as speech 208 over the Internet (or other network) 210 to a server 230. Exemplary mobile devices include cell phones, smartphones, tablets, laptops, wearable devices (such as smart watches, computer-integrated eyewear, integrated prosthetics, etc.) or technology embedded within users. Other embodiments can use "fixed," or non-mobile devices such as work-stations and personal computers for the receiving device 206.

The server 230, upon receiving the utterance 204, performs an analysis of the utterance 204 to determine demographics and/or prosody of the user 202. Exemplary demographics which the server 230 may identify in the utterance 204 are age, accent, socio-economic level, education level, ethnicity, race, profession, location of childhood, and previous/current places of residence, employment, or education. Such demographics can be derived via a voice analysis of the utterance 204 alone, or can be based on analyses of previous utterances in conjunction with the current voice analysis. The previous analyses can be stored in a database 228. Similarly, the previous utterances themselves can be stored in the database 228 in a lattice or other data structure which correlates the utterance to known demographics. These previous utterances and their associated demographics can then be used during the voice analysis of the current utterance 204 to identify possible demographics.

Determining which demographics are associated with a user speaking an utterance can be based on a combination of which words are spoken and how the words are spoken. As an example of how the server considers which words are spoken, consider certain words only spoken by specific age groups, gender, ethnicities, professions, or people living in a specific neighborhood. From those derived demographics, additional demographics may be identified. Consider the analysis of "Cerebral Autosomal Dominant Arteriopathy with Subcortical Infarcts Leukoencephalopathy." The server 230, upon detecting the utterance, can determine that the person uttering the phrase is either a doctor or someone afflicted by the disease. Based on every word being correctly pronounced, the server 230 decides the speaker 202 is a doctor, and is therefore given additional demographics of middle to senior age, high education, and high income level. Alternatively, if half of the words are incorrectly spoken, the server 230 can decide the speaker 202 is afflicted or associated with someone afflicted by the disease and is not a doctor. Because half of the words were correctly spoken, the server 230 determines the speaker 202 has a college education, assigning as demographics: college educated, not a teenager, middle income level. Finally, if none of the words were spoken correctly, the server 230 can determine the speaker 202 does not have a high school education and is probably in a low socio-economic level.

As another example of how the voice analysis considers which words are spoken, many words are spoken only by people in a specific geographic location or in a specific age range. A common word among current teenagers is "ratchet," used as an adjective, yet one would not commonly find ratchet being used to describe things by an adult or senior citizen. Likewise, certain words may be used by people attending a specific college or university, or living in a specific town/state, which are not used elsewhere. Certain professions may refer to things in a particular way which is not common elsewhere.

The server 230, in determining if the words spoken signify that the user belongs to a specific demographic, can identify the context in which the word or utterance was spoken, assigning a confidence level between the utterance and various demographics. When the confidence level reaches a confidence threshold for a particular demographic, the user is associated with that particular demographic. Such associations can likewise be removed based on other word/utterance usage diminishing confidence levels below the required confidence level. In addition to context, the server 230 can determine domain for the utterance 204 which, in combination with other factors, and aid in identifying the demographics of the user. The identified domains can be topic specific, based on previously recorded utterances/demographics, or a current location of the user. For example, if a user states "Subway" in New York City, the domain of the utterance and demographics derived from that domain are very distinct from a user stating "Subway" in Santa Fe, N. Mex. because in the first case the user is probably speaking about a form of mass transportation, whereas in the second the user is probably speaking about a restaurant.

The voice analysis of what words are used can be performed in conjunction with how the utterance is spoken. If a particular accent is determined in the utterance, or in combination with previously recorded utterances, the server 230 can assign to the user demographics associated with that accent. For example, if a user has a thick New Jersey accent, the demographics assigned can be based on the average New Jersey demographics. in certain cases, the average demographics can be the initial starting point for the remaining demographics. Thus is the average age and income for New Jersey were 55 years old and an income of $55,000, those demographics can be initially assigned to the user, then modified based on word choices and other points of analysis regarding how the utterance is spoken. Other exemplary extractions which the voice analysis can determine based on how the utterance is spoken is ethnicity, geographic origin, place of education, trade/profession, hobby, and/or race.

How the speaker 202 speaks the utterance 202 is referred to as the prosody of the user. The prosody of the user includes the pitch, duration, rhythm, loudness, and/or syllable length. The voice analysis to determine prosody of the user 202, and how the speaker 202 speaks the utterance 204, can be part of the voice analysis for determining the user demographics, or can occur in conjunction with the demographic voice analysis. As with word choice, the prosody of the user 202 can be determined based on previous utterances or previous utterance analyses, which can be stored in the database 228 or elsewhere. The previous utterances or analyses can be recent (in the current dialog/conversation) or can be from past dialogs.

Having analyzed the received speech 208, the server 220 requests 212 recorded speech matching the demographics of the received speech 208 from Internet 210 accessible resources 214, 216, 218, 220, 222, 224. Exemplary resources include audio files, such as MP3 files 214, Podcasts 216, Movies 218, other websites 220, News sites 222, and audio books 224. For example, the illustrated utterance "Beware the Ides of March," 204 might produce demographics associated with a Shakespearean actor, resulting in the server 230 requesting recorded audio 212 corresponding to a Shakespearean actor. In such a case, the requested recorded audio 212 may come from audio recordings of other Shakespeare works, Podcasts 216 associated with Shakespeare, or Movies 218 of Shakespeare. If the demographics indicate a middle aged male doctor from Louisiana working in South America, the server 230 can request audio corresponding to an educated, middle aged doctor having a Louisiana accent slightly changed by living in South America. Such specific audio can be requested 212, and the various Internet 210 linked resources 214, 216, 218, 220, 222, 224 can produce recorded audio matching those demographics.

The Internet 210 linked resources 214, 216, 218, 220, 222, 224 respond to the request 212, providing data 226 to the server 230 associated with the demographics. The received data 226 can include information resulting in additional demographics being identified—such as the average age of people in a specific geographic region associated with the speaker. The data can also include recorded speech matching the prosody of the user 202, and being associated with the demographics of the user 202 as identified by the server 230. For example, the speech data received 226 may have a prosody matching the middle aged male doctor from Louisiana working in South America, spoken by a middle aged male doctor from Mississippi. In such an example, the demographics are not identical, but are within a threshold distance from the identified demographics to qualify as "close enough." The server 230 then saves the data and recorded speech to a database for use in generating speech similar to the speech of the user. The saved speech and accompanying data forms at least part of a voice profile specific to the user. Thus the middle aged male doctor from Louisiana working in South America could hear an educated Southern doctor speaking with similar prosody, accent, and intonation to the middle aged doctor.

Figure 3:
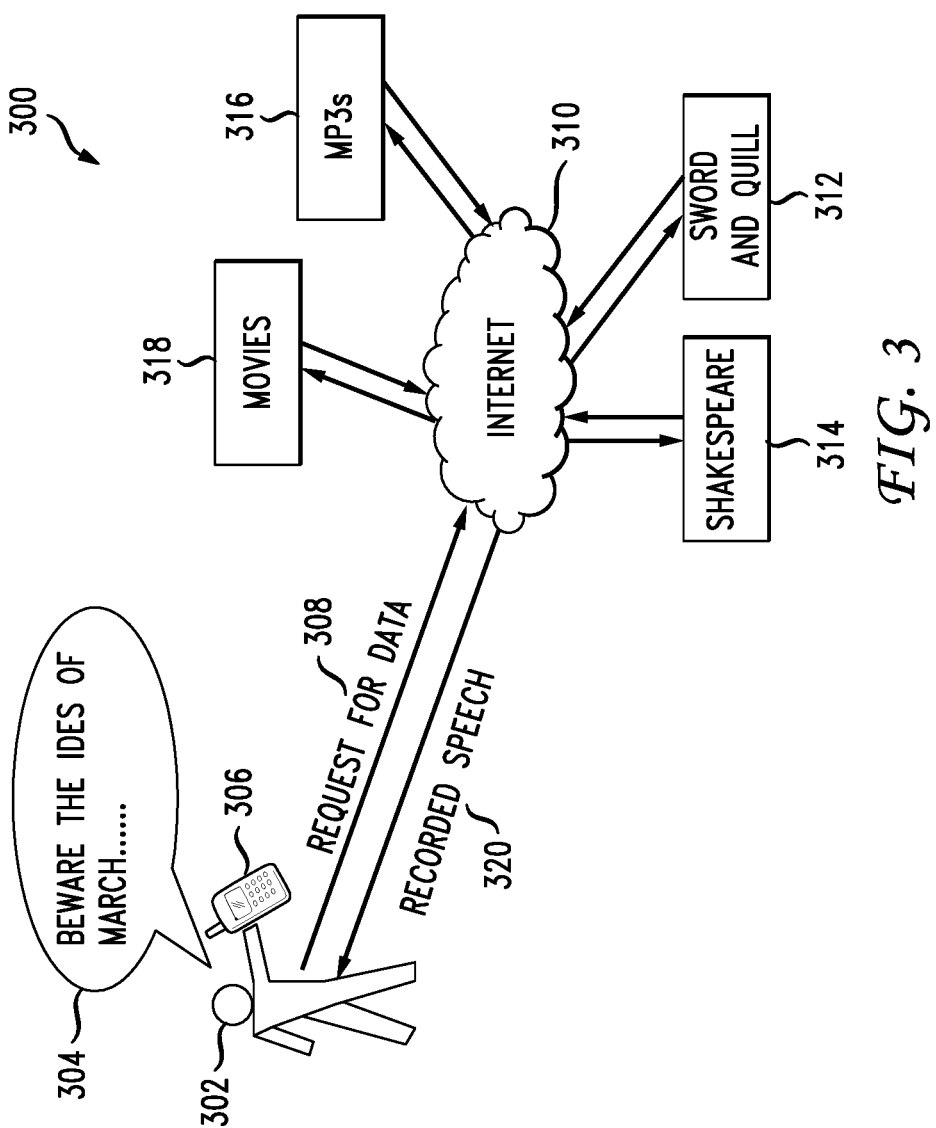
FIG. 3 illustrates a second exemplary system architecture.

FIG. 3 illustrates a second exemplary system architecture 300, where the voice analysis and data storage occur on the mobile device 306. Again the user 302 speaks an utterance 304 which is captured by a mobile device 306. Exemplary mobile devices include cell phones, smartphones, tablets, laptops, wearable devices (such as smart watches, computer-integrated eyewear, integrated prosthetics, etc.) or technology embedded within users. The mobile device 306 then performs the voice analysis on the utterance, identifying the demographics of the user and the prosody of the user. The voice analysis can be a single stage voice analysis, identifying the demographics of the user while also identifying the prosody of the user, or a multi-stage analysis where the demographics and prosody of the user are identified individually through an iterative and/or multi-phase process, the iterative and/or multi-phase process basing prosody off identified demographics and vice-versa.

The mobile device 306, like the server 230 of FIG. 2, sends out a request for data 308 to various resources/databases 312, 314, 316, 318 connected via the Internet 310 or other network. The request for data includes a request for data associated with the demographics and a request for recorded speech associated with the demographics which matches the identified prosody. As illustrated, the various databases include a Sword and Quill database 312, a Shakespeare database 314, and various MP3 316 and Movie 318 databases. These resources can provide data associated with the demographics identified, as well as recorded speech 320, to the mobile device 306 performing the voice analysis. The mobile device 306 can then store the demographic related data and the recorded speech received for use in generating future speech which sounds similar to the speech of the user 302.

Figure 4:
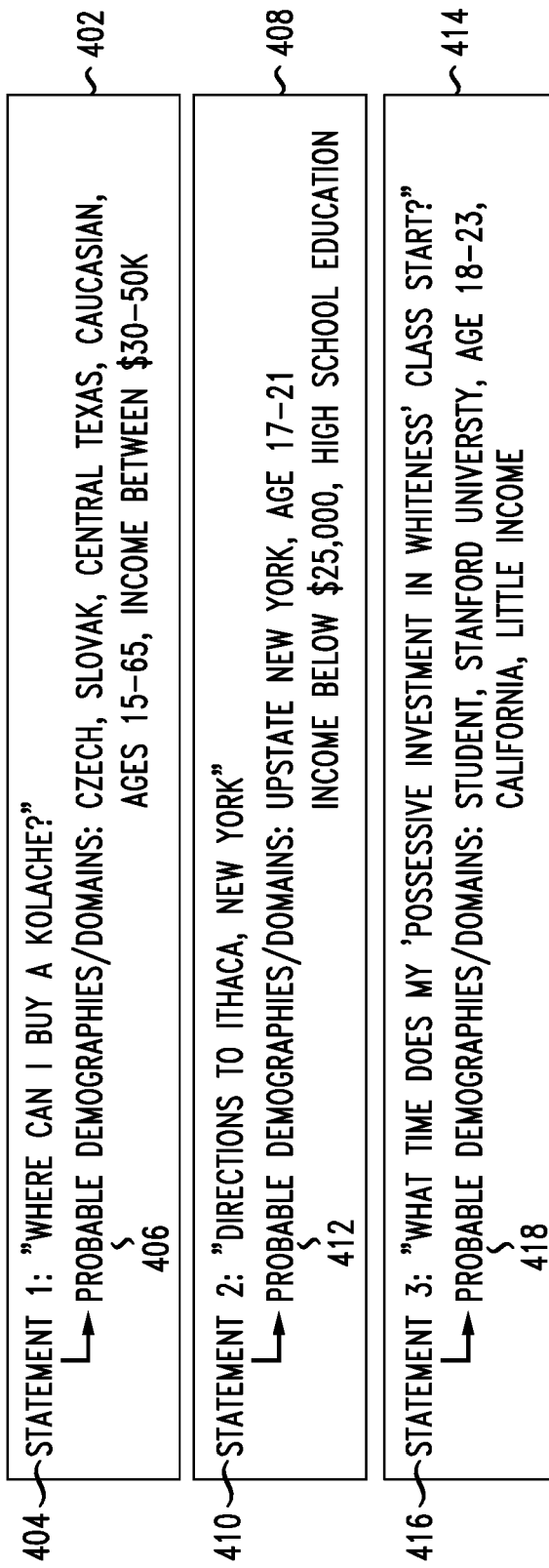
FIG. 4 illustrates various statements and derived demographics.

FIG. 4 illustrates various statements and derived demographics, illustrating various possible demographics determined based on the user statements. The first user statement 404, "Where can I buy a kolache?" (a kolache being a delicious pastry) may indicate the ethnicity of the user, or the geography of the user, because kolaches are most common among Czech, Slovak, and people in Central Texas, specifically the city of West, Tex. Based on those various factors, the demographics 406 assigned to the speaker are: Czech, Slovak, and Central Texas. Additional demographics which are derived based on the Czech, Slovak, and Central Texas demographics are Caucasian, age 15-65, and an income between $30-$50 k. These assigned demographics may change as additional data is received, additional utterances are analyzed, or based on the current location of the user. Thus, if the user is wandering around Prague, the "Central Texas" demographic, and any data derived based on the Central Texas demographic, will be replaced with more appropriate demographic data. All of this information 402 can be then be stored and used for retrieving corresponding data and/or recorded statements corresponding to the demographic data.

The second statement 410, "Directions to Ithaca, New York" is spoken by someone the system believes to be in high school. Such a determination can be due to the pitch of the voice, the time of day when the utterance is made, the location of the user when the utterance is made, and/or additional utterances and the associated analyses of those utterances. For example, if the utterance received 410 has a relatively high pitch, and is received near a high school, the age range can be determined as 17-21. Because of the GPS location, or based on the nature of the utterance, the demographics 142 are determined to be upstate New York with the determined age range of 17-21. The system sends a request for data and recorded audio based on these extracted demographics. In response the system receives, from various databases/websites, an income range typical for high school students, or for recent high school graduates—an income below $25 k and a high school education. The system also receives spoken/recorded utterances having a prosody matching the prosody of the utterance 410, then saves the demographics, the received data associated with the demographics, and the received recorded utterances. The data structure of the saved information 408 can be a lattice structure or any other data structure capable of accessing the received utterances and/or demographic data in an efficient manner.

The third statement 416, "What time does my 'Wheel Design for $18^{th}$ Century Covered Wagons' class start?" The system receiving the statement performs an analysis of the utterance and determines "Wheel Design for $18^{th}$ Century Covered Wagons" is a class taught at only a single university in the world—Acme University located in California. In addition, because the user is stating they are enrolled in the particular class, the known demographics of the user are a student at Acme. From these demographics, further data can be retrieved from the Internet, putting the probable age of the user between 18 and 23, in California, with little or no income. The system also receives spoken/recorded utterances having a prosody matching the prosody of the utterance 416, then saves the demographics 418, the received data associated with the demographics 418, and the received recorded utterances. The data structure of the saved information 414 can be a lattice structure or any other data structure capable of accessing the received utterances and/or demographic data in an efficient manner.

Figure 5:
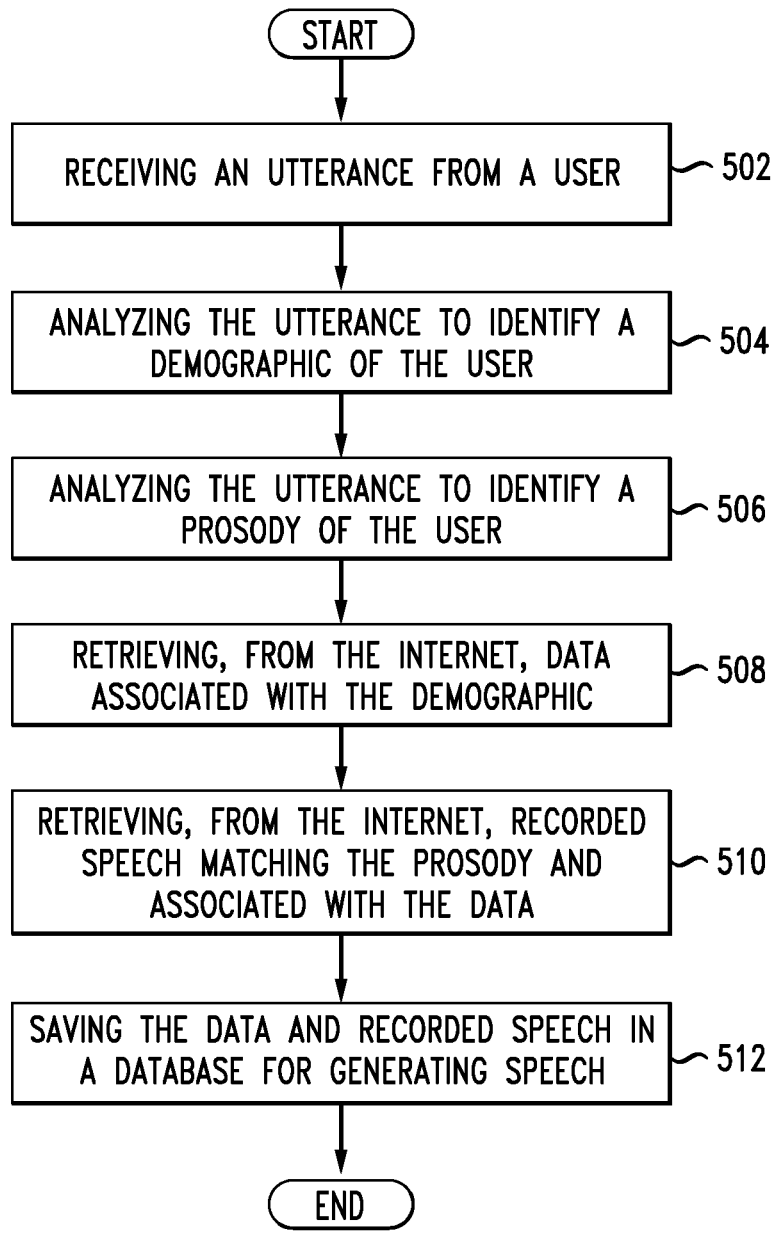
FIG. 5 illustrates an example method embodiment.

Having disclosed some basic system components and concepts, the disclosure now turns to the exemplary method embodiment shown in FIG. 5. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 receives an utterance from a user (502), then performs an analysis of the utterance to identify demographics of the user (504). Exemplary demographics can include age, gender, ethnicity, education level, socio-economic level, profession, and/or geographic location. Geographic location can include where a person went to school, where they grew up, and where they currently reside on a neighborhood, city, county, state, or national level. The system 100 also analyses the utterance to identify a prosody of the user (506). The prosody can, for example, include the accent, the pitch, the rate, and an energy of the utterance. These analyses can be a single analysis which identifies the demographics and the prosody together, or separate analyses working in serial, in parallel, and/or iteratively repeating until a convergence is met.

The system 100 then retrieves, from the Internet (or other database), data associated with the demographic (508). For example, if a demographic indicating the person lives in Brooklyn, N.Y. is identified, the data retrieved may be the average salary of individuals living in Brooklyn. The system 100 also retrieves, from the Internet, recorded speech matching (or within a threshold closeness to) the prosody of the received speech and associated with the received data (510). The data and recorded speech are obtained from databases connected to the Internet, such as blogs, social media websites, novels, movies, audiobooks, podcasts, and mp3s. For example, if, upon analyzing the utterance, it appears the user is a professor of Engineering in Florida, the system 100 can access social media such as Facebook or Twitter to obtain data associated with professors of Engineering in Florida. Such extraction and identify specific vocabulary of the identified demographic, with the system 100 then searching for recorded speech corresponding to the demographic specific vocabulary. For example, if the system identifies that the professor of Engineering from Florida is likely to use the word "Fourier," the system can extract audio corresponding to a Floridian speaking "Fourier" from a video found on the Internet. The system 100 then saves the data and the recorded speech received in a database for generating speech (512). The saved data and the recorded speech can then be used for generating speech and responding to the user with a prosody and vocabulary specific to the individual.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein to processing performed on a mobile device or a server device in a server/client configuration. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    transmitting, via a computing device and based on a request from a speech processing system, data associated with a demographic of a user that provided an utterance to the speech processing system; and
    transmitting, via the computing device and based on the request from the speech processing system, recorded speech associated with the utterance, wherein the data and the recorded speech associated with the utterance are saved in a local database to the speech processing system and used for generating speech based on the data and the recorded speech.

2. The method of claim 1, wherein the speech processing system further analyzes the utterance to identify the demographic of the user and a prosody of the utterance.

3. The method of claim 1, wherein the recorded speech is transmitted from a first database and the data associated with the demographic of the user is transmitted from a second database.

4. The method of claim 2, wherein the prosody of the utterance comprises an accent, a pitch, a rate, and an energy of the utterance.

5. The method of claim 1, wherein the demographic of the user comprises one of an age, a gender, an ethnicity, an education level, and an economic status.

6. The method of claim 1, wherein the demographic of the user comprises a geographic location.

7. The method of claim 1, wherein the data that is transmitted retrieved from one of a blog, a social media website, and a book.

8. A system comprising:
    a processor; and a computer-readable storage medium having instructions stored which, when executed by the processor, cause the processor to perform operations comprising:

transmitting, based on a request from a speech processing system, data associated with a demographic of a user that provided an utterance to the speech processing system; and transmitting, based on the request from the speech processing system, recorded speech associated with the utterance, wherein the data and the recorded speech associated with the utterance are saved in a local database to the speech processing system and used for generating speech based on the data and the recorded speech.

9. The system of claim 8, wherein the speech processing system further analyzes the utterance to identify the demographic of the user and a prosody of the utterance.

10. The system of claim 8, wherein the recorded speech is transmitted from a first database and the data associated with the demographic of the user is transmitted from a second database.

11. The system of claim 9, wherein the prosody of the utterance comprises an accent, a pitch, a rate, and an energy of the utterance.

12. The system of claim 8, wherein the demographic of the user comprises one of an age, a gender, an ethnicity, an education level, and an economic status.

13. The system of claim 8, wherein the demographic of the user comprises a geographic location.

14. The system of claim 8, wherein the data that is transmitted retrieved from one of a blog, a social media website, and a book.

15. A computer-readable storage device having instructions stored which, when executed by a system, cause the system to perform operations comprising:

transmitting, based on a request from a speech processing system, data associated with a demographic of a user that provided an utterance to the speech processing system; and transmitting, based on the request from the speech processing system, recorded speech associated with the utterance, wherein the data and the recorded speech associated with the utterance are saved in a local database to the speech processing system and used for generating speech based on the data and the recorded speech.

16. The computer-readable storage device of claim 15, wherein the speech processing system further analyzes the utterance to identify the demographic of the user and a prosody of the utterance.

17. The computer-readable storage device of claim 15, wherein the recorded speech is transmitted from a first database and the data associated with the demographic of the user is transmitted from a second database.

18. The computer-readable storage device of claim 16, wherein the prosody of the utterance comprises an accent, a pitch, a rate, and an energy of the utterance.

19. The computer-readable storage device of claim 15, wherein the demographic of the user comprises one of an age, a gender, an ethnicity, an education level, and an economic status.

20. The computer-readable storage device of claim 15, wherein the demographic of the user comprises a geographic location.

* * * * *